United States Patent [19]

Savas et al.

[11] Patent Number: 4,859,336

[45] Date of Patent: Aug. 22, 1989

[54] FILTERING DEVICE FOR DISPENSING AND FILTERING FROM SAMPLES

[75] Inventors: Peter G. Savas, Concord, Mass.; Virginia S. Kiger, Old Bridge, N.J.

[73] Assignee: Genex Corp., Gathersburg, Mass.

[21] Appl. No.: 58,390

[22] Filed: Jun. 5, 1987

[51] Int. Cl.⁴ .................. B01D 35/02; A61M 5/31
[52] U.S. Cl. ........................ 210/416.1; 210/472; 422/101; 222/189; 604/190
[58] Field of Search ............ 210/251, 416.1, 472, 210/477, 482; 422/100, 101; 222/189, 386, 387; 604/190

[56] References Cited

U.S. PATENT DOCUMENTS

| | | | |
|---|---|---|---|
| 2,432,073 | 12/1947 | Hargen | 210/416.1 |
| 2,461,211 | 2/1949 | Guthrie | 222/387 |
| 3,493,503 | 2/1970 | Mass | 604/190 |
| 3,608,736 | 9/1971 | Wong | 210/477 |
| 3,859,999 | 1/1975 | Ishikawa | 604/190 |
| 4,043,335 | 8/1977 | Ishikawa | 604/190 |
| 4,413,059 | 11/1983 | Tihon et al. | 210/416.1 |
| 4,548,245 | 10/1985 | Crandell et al. | 422/100 |

FOREIGN PATENT DOCUMENTS

| | | | |
|---|---|---|---|
| 3342695 | 5/1984 | Fed. Rep. of Germany | 210/251 |
| 468627 | 7/1914 | France | 222/386 |
| 123881 | 2/1927 | Switzerland | 222/386 |

Primary Examiner—Richard V. Fisher
Assistant Examiner—Linda S. Evans

[57] ABSTRACT

A filtering device for fluids which includes a barrel with an open end and a flow discharge end. A plunger is slidably disposed in the barrel through the open end toward the discharge end and an exhaust nipple projects from the discharge end. The nipple is in communication with the interior of the barrel. A filter is disposed adjacent the barrel inwardly of and adjacent to the discharge nipple, and an annular, integral support stand is disposed at the discharge end of the barrel and surrounds the nipple. The nipple terminates at a point spaced from a planar surface defined by the support stand, which surface is normal to the axis of the barrel and the direction of movement of the plunger whereby the device will stand on a surface with the exhaust nipple spaced from the surface.

24 Claims, 3 Drawing Sheets

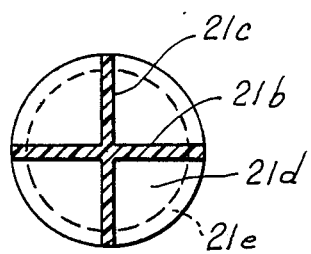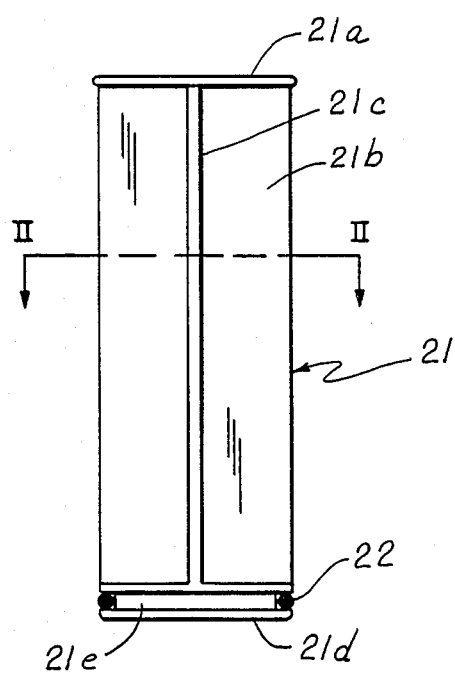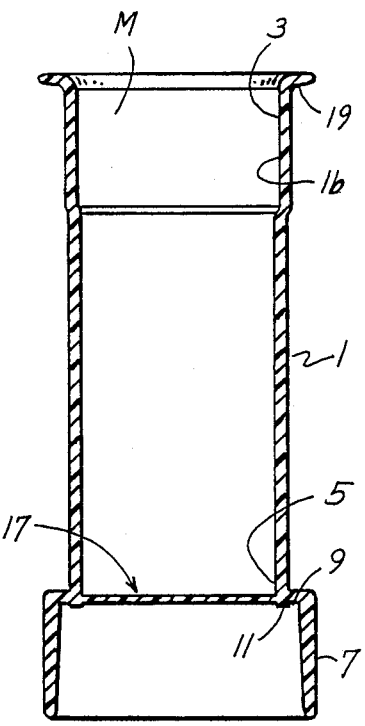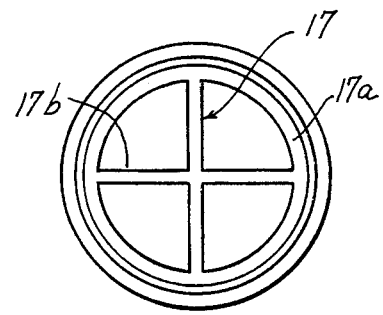
Fig. 2
Fig. 3
Fig. 1
Fig. 4

FILTERING DEVICE FOR DISPENSING AND FILTERING FROM SAMPLES

BACKGROUND OF THE INVENTION

1. Field of the Invention

The present invention relates to a filtering device and particularly to a disposable dispensing filtering device suitable for use in filtering dissolved and undissolved materials from chemical and biological samples. Especially, the device is useful for use in conjunction with automatic testing and evaluation equipment and kits wherein the sample to be tested is automatically transferred to a test vial which is housed in a base.

2. Description of the Prior Art

In the past, it has been conventional to filter specimens with filtering devices that include a barrel, a plunger slidably disposed in the barrel, and a filter removably disposed on a nipple which is attached to the discharge end of the barrel. The filters which have been conventionally used have a female member which removably engages the nipple. The barrel has usually included a flange at the entry end, that is the end opposite the end having the nipple. This flange aids the user in grasping the barrel to enable the exertion of pressure on the plunger whereby the sample can be urged thrugh the filter and the nipple. Moreover, the inner diameter of the barrel has closely approximated the diameter of the plunger over the entire length of the barrel. Additionally, the top of the nipple was usually exposed so that the filtering device could only rest on its side.

SUMMARY OF THE INVENTION

We have now found that several improvements can be made on the basic design of the filtering device of the prior art whereby it is easier to handle, and more easily used with automatic equipment. We have found that the filter can be integrally disposed at the discharge end of the barrel. A support stand is also disposed at the discharge end of the barrel whereby to provide protection for the filter, and to enable the filtering device to be stood on its end, when the support stand and the nipple are constructed with a precise relation with each other. Moreover, when the support stand is constructed with a precise relationship with the flange at the entry end, the filtering device can be more easily used with automatic equipment in that the filtering device can be made to roll in a straight line on its side. Thus, the filtering device of the present invention can be either stood on its end, or allowed to roll on its side. Additionally, we have found that if the internal diameter of the entry end of the barrel is enlarged somewhat, or if a vent is disposed in it, the insertion of the plunger is easier and drool from the discharge end of the nipple is inhibited since entrapped air is allowed to escape through the entry end rather then forcing the sample through the filter prematurely.

In addition, we have found that through the use of a nipple with a support stand of a specific configuration around it, then the sample can be easily transferred to a sample vial, and vials of many different sizes can be accomodated in a base that is used to support them.

BRIEF DESCRIPTION OF THE DRAWINGS

FIG. 1 is a side elevational view of the plunger which is used with the present invention.

FIG. 2 is a cross-sectional view taken along the lines II—II of FIG. 1.

FIG. 3 is a cross-sectional elevational view of the barrel of the dispenser.

FIG. 4 is a top plan view of the barrel.

DESCRIPTION OF THE PREFERRED EMBODIMENTS

Figure 5:
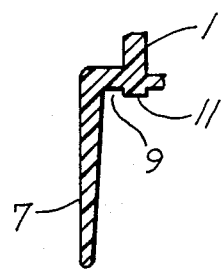
FIG. 5 is an enlarged cross-sectional view of the joint between the barrel and the support stand shown in FIG. 7 showing a groove and a ring that is used for welding the parts of the dispenser together.
Figure 6:
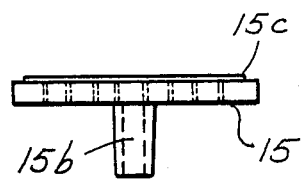
FIG. 6 is a side elevational view of a nipple used for retaining the filter in the dispenser.

Referring now to FIGS. 1 to 7, the filtering device is formed of polypropylene and includes a barrel 1 with an open end 3 and a flow discharge end 5. A support stand 7 is disposed on the bottom of the barrel 1. The support stand 7 is preferably of a diameter larger than the diameter of the barrel 1 so as to provide for a groove 9 and an internal annular ring 11 that will be used to attach a nipple 15 to the filtering device. Attachment of the nipple 15 to the ring 11 is best accomplished by ultrasonic welding in which the plastic of the ring 11 bonds with the plastic that forms the edge 15c of the nipple 15.

Such bonding occurs through a layer of filter media 15a. The filter media 15a that is selected may be made from any of the filter media conventionally used in the art.

The filter media 15a is disposed inwardly beneath a stop 17 which is molded into the flow discharge end 15 of the barrel 1. In the preferred embodiment, the stop 17 includes an annular flange 17a and a pair of intersecting members 17b, best arranged in a grid or cruciform shape.

Figure 7:
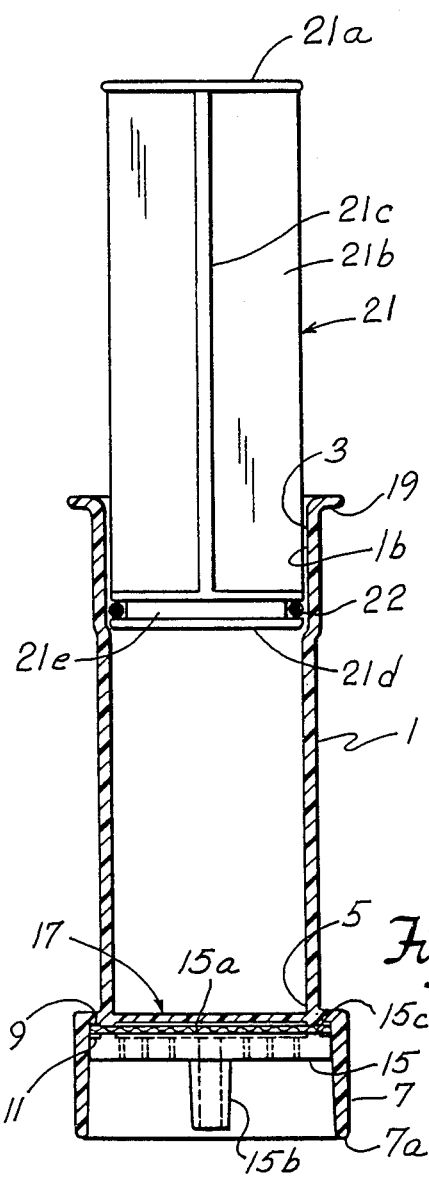
FIG. 7 is an elevational view showing the plunger disposed within the barrel.

As can be seen in FIGS. 3 and 7, the open end 3 of the barrel has a vent area 1b which has a diameter that is larger than the rest of the barrel 1. While the depicted embodiment shows an enlargement of the entire diameter of the open end 3, it may be possible to use one or more slots in a barrel of uniform diameter. The function of either of these embodiments is to enable the user to insert the plunger easily into the open end 3 of the barrel 1 and enable air that becomes entrapped inside to escape easily, without forcing the fluid sample in the filtering device to ooze into the filter. Either of these types of vent ports will enable the users to initially insert the plunger into the barrel 1.

For some applications, it may be desirable further to increase the internal diameter of the barrel 1 at the open end 3 to enable a user to easily introduce the plunger 21 into the barrel 1 (not shown). In any event, whether a two-tier diameter barrel or a three-tier diameter barrel is used, a flange 19 having a predetermined diameter is disposed around the mouth M of the barrel 1. The diameter of the flange 19 is the same as the outer diameter of the support stand 7. In this way, when the filtering device is laid on its side, it will roll in a straight line, which is especially useful with some automatic equipment. For example, when a group of filtering devices is stacked in a container prior to automatic handling, they can roll on a Z-shaped ramp so that they are easily arranged and dispensed while occupying a small area.

A plunger 21 is disposed in the barrel 1 and can be urged by applying force to the top 21a. In the preferred embodiment, the body of the plunger is formed of two intersecting members 21b and 21c. A channel 21e is disposed in the lower end 21d and an O-ring 22 is seated in it. The O-ring 22 will engage the interior of the barrel 1 and prevent discharge of the sample (after the plunger is urged past the vent area 1b). The face of the lower end 21d of the plunger can engage air which engages the fluid sample. While an O-ring 22 is the preferred means to prevent discharge, it is also possible to mold one or more flexible flanges on the lower end 21d which will exert a wiping action against the inner walls of the barrel 1.

The use of an O-ring 22 or similar sealing means on the lower end 21d enables a simplification of manufacture and of sterility in the sample being tested. In many of the devices of the prior art, the sealing is accomplished with a separately attached rubber wiper. Such wipers are more expensive and they also can contaminate certain samples in that the solvents used for the samples can leach some of the constituents of the rubber.

As previously mentioned, the filter media is disposed between the nipple 15 and the stop 17. The nipple 15 can be formed of a disc with a series of radial flow channels which lead into a central port 15b. The exterior of the central port 15b of the nipple 15 can be configured to match standard Luer specification but may be adjusted as required by the task to be performed. As can be seen most clearly on FIG. 7, the end of a nipple 15 terminates at a point spaced from a planar surface defined by the support stand 7 which is normal to the axis of the barrel 1 and the direction of movement of the plunger 21, whereby the device will stand on a surface with the exhaust nipple 15 spaced from the surface. In other words, the nipple 15 is wholly enclosed within the support stand 7.

While the plunger 21 and the barrel 1 have been described as being cylindrical, it will be understood that they can assume other cross-sectional shapes as well. For example, they could be triangular, rectangular, polygonal or hexigonal. The cylindrical form is preferred because of ease of manufacture, but as long as the plunger and barrel each have the same cross-sectional configuration (the piston being smaller, of course) with their walls being parallel or symmetrical to their axis respectively.

Figure 8:
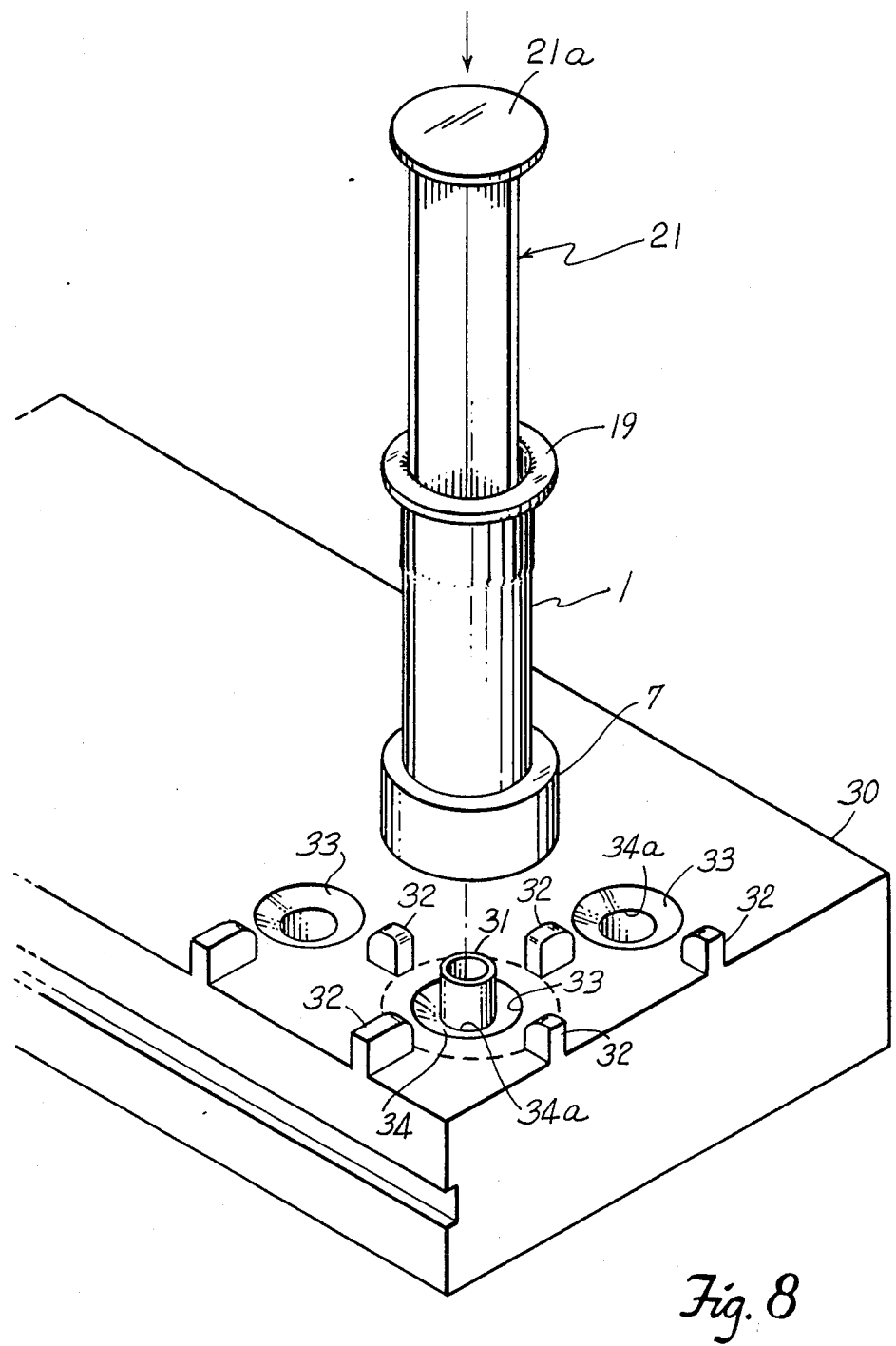
FIG. 8 is a perspective view of the dispenser ready to be disposed over the mouth of a sample vial that is housed in a cavity in a base.

Turning now to FIG. 8, the filtering device is shown poised over a base member 30 with the nipple (not shown) in axial alignment with a vial 31 that is held within a cavity 33. Upon downward movement of the filtering device, the nipple will enter the mouth of the vial 31 to dispense a filtered sample for testing.

The perimeter of the support stand 7 engages the insides of a centering device that can be formed of upstanding legs 32 that are equidistantly spaced from the axis of the cavity 33.

A wide variety of sample vials an be disposed within the cavity 33, and axial alignment is assured through the use of an insert 34. Insert 34 has a central cavity 34a (which can have a base not shown) to elevate the vial 31 to a predetermined height to receive the nipple 15. The space between insert 34 and centering devices 32 can be concave so as to accomodate any spills that may occur.

An array of cavities 33 with a plurality of inserts 34 in the shape of hollow sleeves can be disposed in the base 30 with similar centering devices 32 that can be disposed on the base so as to receive a plurality of vials 31.

In operation of the filtering device, a sample of fluid is poured into the barrel 1. The sample to be filtered is disposed over the filter media 15a. The filter media can be any of those well known to the art in chemical and biological processes. For example, Teflon or Nylon having a predetermined porosity of between about 0.001 to 200 microns is satisfactory for the filter media. The Teflon is available from W. L. Gore and Associates and the Nylon is available from Cuno Laboratories Inc.

After the sample is poured in, the plunger 21 is grasped and inserted into the barrel 1. Initial entry of the face 21d of the plunger does not force the fluid sample through the filter media 15a or the nipple 15 because of the vent port 1b which provides relief to the entry of the face 21d. When the O-ring 22 engages the inside of the barrel 1, the fluid will be forced into the inside of 15b of the nipple 15. The air which is entrapped after the plunger passes by the vent 1b will urge against the sample in the barrel 1 and force the sample through the filter 15. When the lower end of the plunger 21d encounters the stop 17, the air cushion will urge all remaining sample in the barrel 1 through the filter 15a and into the nipple 15.

The nipple of the filtering device is within a sample vial 31 which is held in the base 30. The bottom 7a of the support stand 7 rests upon the edges of the cavity 32 in the base 30. The sample will be fully filtered and dispensed when the face 21d of the plunger engages the stop 17. When the plunger is fully depressed, the sample will be fully eliminated from the barrel and passed into the test vial 31.

It is apparent that modifications and changes can be made within the spirit and scope of the present invention, but it is our intention, however, only to be limited by the appended claims.

As our invention, we claim:

1. A filtering device for fluids comprising:
   a barrel having an open end and a flow discharge end;
   a plunger having an engaging end disposed in the barrel, said plunger being slidable through the open end toward the discharge end;
   an exhaust nipple projecting from the discharge end and in communication with the interior of the barrel;
   a filter disposed adjacent the barrel inwardly of and adjacent to the discharge nipple;
   stop means disposed between said filter and said engaging end of said plunger said stop means formed into the flow discharge end of said barrel; and
   an annular, integral support stand disposed at the discharge end of the barrel and surrounding the nipple, said nipple terminating at a point spaced from a planar surface defined by the support stand which surface is normal to the axis of the barrel and the direction of movement of the plunger whereby the device will stand ono a surface with the exhaust nipple spaced from said surface.

2. The filtering device according to claim 1 wherein the plunger has an engaging end, the engaging end of the plunger being disposed to engage the fluids contained within the barrel.

3. The filtering device according to claim 1 wherein the stop means is cruciform in shape.

4. A filtrate dispensing and receiving device comprising:

a filtering device having a barrel with an open end and a flow discharge end;

a plunger disposed in the barrel and slidable through the open end towards the discharge end;

an exhaust nipple projecting from the discharge end and in communication with the interior of the barrel;

a filter disposed adjacent the barrel inward of and adjacent to the discharge nipple;

an annular, integral support stand disposed at the discharge end of the barrel and surrounding the nipple;

said nipple terminating at a point spaced from a planar surface defined by the support stand, which surface is normal to the axis of the barrel and the direction of movement of the plunger whereby the device will stand on a surface with the exhaust nipple spaced from said surface;

a base disposed beneath said filtering device, at least one cavity formed in said base;

guide means disposed around said cavity and arranged to engage said support stand whereby to center said filtering device on the perimeter of said cavity over a vial; and means to dispose said nipple within the mouth of said vial.

5. The filtrate dispensing and receiving device according to claim 4 wherein the guide means include at least one upstanding peripheral engagement member arranged to engage the outer sidewall of said support stand.

6. The filtrate dispensing and receiving device according to claim 5 further including a hollow sleeve, said hollow sleeve being disposed in said cavity whereby to hold a vial having a diameter smaller than the diameter of said cavity.

7. The filtrate dispensing and receiving device according to claim 4 wherein the plunger has an engaging end, the engaging end of the plunger being disposed to engage the fluids contained within the barrel.

8. The filtrate dispensing and receiving device according to claim 7 further including a stop means disposed between the filter and the engaging end of the plunger.

9. The filtrate dispensing and receiving device according to claim 4 wherein an annular ring is formed between the discharge end of said barrel and the support stand, and said nipple is formed of a disc of the same general shape as said support stand, the periphery of said nipple being welded to said annular ring, whereby to contain said filter within said filtering device.

10. The filtrate dispensing and receiving device according to claim 4 further including relief means disposed adjacent the open end of said barrel whereby when said plunger is pushed into said barrel, air that is in said barrel will vent through the relief means and not force the sample to pass through said filter.

11. The filtrate dispensing and receiving device according to claim 10 wherein the relief means is a vent port disposed on the inside of said barrel.

12. The filtrate dispensing and receiving device according to claim 11 wherein the vent port encircles the entire inside diameter of said barrel.

13. A filtering device for samples comprising:
a barrel having an open end and a flow discharge end;
a plunger disposed in said barrel and slidable through the open end toward the discharge end;

an exhaust nipple having an inlet and an outlet end, said nipple projecting from the discharge end of the barrel, said nipple being in communication with the interior of the barrel;

a filter disposed at the discharge end of said barrel and the inlet end of said nipple;

an annular, integral support stand disposed at the discharge end of the barrel and surrounding said nipple, said nipple being disposed within the confines of said annular support stand; and relief means disposed adjacent the open end of said barrel whereby when said plunger is pushed into said barrel, air that is in said barrel will vent through the relief means and not force the sample to pass through said filter prematurely.

14. The filtering device according to claim 13 wherein the relief means is a vent port disposed on the inside of said barrel.

15. The filtering device according to claim 14 wherein the vent port encircles the entire inside diameter of said barrel.

16. A filtering device for samples comprising:
a barrel having an open end and a discharge end;
a plunger having an inner end and an outer end, said plunger being disposed in said barrel and slidable through said open end;

a nipple attached to said barrel, said nipple having an inlet end and an outlet end, said nipple being disposed adjacent the discharge end of said barrel;

a filter disposed between said discharge and said nipple;

stop means to limit the movement of the plunger towards the filter, said stop means disposed between said filter and the inner end of said plunger, said stop means arranged to engage the inner end of said plunger when the plunger fully enters said barrel; and relief means disposed adjacent the open end of said barrel whereby when said plunger is pushed into said barrel, air that is in said barrel will vent through the relief means and not force the sample to pass through said filter prematurely.

17. The filtering device according to claim 16 wherein the relief means is a vent port disposed on the inside of said barrel.

18. The filtering device according to claim 17 wherein the vent port encircles the entire inside diameter of said barrel.

19. A filtering device comprising:
a barrel having an open end and a flow discharge end;
a plunger disposed in said barrel and slidable through the open end toward the discharge end;

an exhaust nipple having an inlet end and an outlet end, said nipple projecting from the discharge end of the barrel, said nipple being in communication with the interior of the barrel;

a filter disposed at the discharge end of said barrel and the inlet end of said nipple;

an annular, integral support stand disposed at the discharge end of the barrel and surrounding said nipple, said nipple being disposed within the confines of said annular support stand; and an annular ring disposed between the discharge end of said barrel and the support stand, said nipple being formed of a disc of the same general shape as said support stand, the periphery of said nipple being affixed to said annular ring, whereby to contain said filter within said filtering device.

20. A filtering device comprising:

a barrel having an open end and a discharge end;

a plunger having an inner end and a outer end, said plunger being disposed in said barrel and slidable through said open end;

a nipple attached to said barrel, said nipple having an inlet end and an outlet end, said nipple being disposed adjacent the discharge end of said barrel;

a filter disposed between said discharge end and said nipple;

stop means to limit the movement of the plunger towards the filter, said stop means being disposed between said filter and the inner end of said plunger, said stop means arranged to engage the inner end of the plunger when the plunger fully enters said barrel;

a support stand disposed at the lower end of said barrel; and an annular ring disposed between the discharge end of said barrel and said support stand, said nipple being formed of a disc of the same general shape as said support stand, the periphery of said nipple being welded to said annular ring, whereby said filter is contained within said filtering device.

21. A filtering device for fluids comprising:

a barrel having an open end and a flow discharge end;

a round flange disposed about said barrel and adjacent said open end;

a plunger having an engaging end disposed in the barrel, said plunger being slidable through the open end toward the discharge end;

an exhaust nipple projecting from the discharge end and in communication with the interior of the barrel;

a filter disposed adjacent the barrel inwardly of and adjacent to the discharge nipple; and a cylindrical annular, integral support stand disposed at the discharge end of the barrel and surrounding the nipple;

said support stand further having a diameter greater then said barrel, said flange having substantially the same diameter as said annular support stand, whereby said filtering device can be grasped between the fingers and thumb for movement of the plunger, and also rolled on its side in a straight line.

22. A filtering device for fluids comprising:

a barrel having an open end and a flow discharge end;

a plunger disposed in the barrel slidable through the open end toward the discharge end;

a filter disposed adjacent the barrel inwardly of and adjacent to the discharge nipple;

vent means disposed adjacent the open end of said barrel whereby when the plunger is initially inserted into the barrel, air that is in the barrel will vent through the vent means and not force the sample to pass prematurely through said filter;

an exhaust nipple projecting from the discharge end and in communication with the interior of the barrel; and an annular, integral support stand disposed at the discharge end of the barrel and surrounding the nipple;

said nipple terminating at a point spaced from a planar surface defined by the support stand, which surface is normal to the axis of the barrel and the direction of movement of the plunger, whereby the device will stand on a surface with the exhaust nipple spaced from said surface.

23. A filtering device for fluids comprising:

a barrel having an open end and a flow discharge end;

a plunger having an engaging end disposed in the barrel, said plunger being slidable through the open end towards the discharge end;

vent means disposed adjacent the open end of said barrel, whereby when the plunger is initially pushed into the barrel, air that is in the barrel will vent through the vent means;

an exhaust nipple projecting from the discharge end and in communication with the interior of the barrel;

a filter disposed adjacent the barrel inwardly of and adjacent to the discharge nipple;

stop means disposed between said filter and said engaging end of the plunger;

an annular, integral support stand disposed at the discharge end of the barrel and surrounding the nipple; and the nipple terminating at a point spaced from a planar surface defined by the support stand, which surface is normal to the axis of the barrel and the direction of movement of the plunger whereby the device will stand on a surface with the exhaust nipple spaced from said surface.

24. A filtering device for fluids comprising:

a barrel having an open end and a flow discharged end;

a round flange disposed about said barrel, and adjacent said open end;

a plunger having an engaging end disposed in the barrel, said plunger being slidable through the open end towards the discharge end;

vent means disposed adjacent the open end of the barrel whereby when the plunger is initially pushed into the barrel, air that is in the barrel will be forced out through the vent means;

exhaust nipple means projecting from the discharge end and in communication with the interior of the barrel;

a filter disposed adjacent the barrel inwardly of and adjacent to the discharge nipple;

stop means disposed between said filter and said engaging end of the plunger; and a cylindrical annular, integral support stand disposed at the discharge end of the barrel and surrounding the nipple;

said support stand further having a diameter greater then said barrel, said flange having substantially the same diameter as said annular support stand, whereby said filtering device can be grasped between the fingers and thumb for movement of the plunger, and also rolled on its side in a straight line.

* * * * *

UNITED STATES PATENT AND TRADEMARK OFFICE
CERTIFICATE OF CORRECTION

PATENT NO. : 4,859,336

DATED : August 22, 1989

INVENTOR(S) : Savas, et al

It is certified that error appears in the above-identified patent and that said Letters Patent is hereby corrected as shown below:

On the title page, item [75] Inventors: Peter G. Savas, Concord, MA
Virginia S. Kiger, Old Bridge, NJ
Ronald R. Boudreau, Fitchburg, MA

[73] Genex Corp., Gaithersburg, MD

Signed and Sealed this

Fourteenth Day of August, 1990

Attest:

HARRY F. MANBECK, JR.

*Attesting Officer*         *Commissioner of Patents and Trademarks*